United States Patent
Gadat et al.

(10) Patent No.: US 10,396,961 B2
(45) Date of Patent: Aug. 27, 2019

(54) METHOD AND SYSTEM FOR COMMUNICATION IN A HYBRID SATELLITE/TERRESTRIAL NETWORK

(71) Applicant: THALES, Courbevoie (FR)

(72) Inventors: Benjamin Gadat, Toulouse (FR);
Nicolas Van Wambeke, Toulouse (FR);
Christian Peyrotte, Toulouse (FR)

(73) Assignee: THALES, Courbevoie (FR)

( * ) Notice: Subject to any disclaimer, the term of this patent is extended or adjusted under 35 U.S.C. 154(b) by 124 days.

(21) Appl. No.: 14/953,217

(22) Filed: Nov. 27, 2015

(65) Prior Publication Data
US 2016/0156448 A1  Jun. 2, 2016

(30) Foreign Application Priority Data

Nov. 28, 2014 (FR) .................................... 14 02709

(51) Int. Cl.
| | |
|---|---|
| *H04L 5/00* | (2006.01) |
| *H04B 7/155* | (2006.01) |
| *H04B 7/185* | (2006.01) |
| *H04L 1/18* | (2006.01) |

(52) U.S. Cl.
CPC .......... *H04L 5/0055* (2013.01); *H04B 7/155* (2013.01); *H04B 7/185* (2013.01); *H04B 7/18508* (2013.01); *H04L 1/1812* (2013.01)

(58) Field of Classification Search
CPC . H04L 5/0055; H04L 1/1812; H04B 7/18508; H04B 7/155; H04B 7/185
See application file for complete search history.

(56) References Cited

U.S. PATENT DOCUMENTS

| | | | |
|---|---|---|---|
| 8,160,623 B1* | 4/2012 | Talley | H04L 51/30 370/329 |
| 2003/0007465 A1* | 1/2003 | Artzi | H04B 7/18595 370/316 |
| 2004/0196798 A1 | 10/2004 | Abousleman | |
| 2006/0094352 A1* | 5/2006 | Karabinis | H04B 7/18543 455/13.4 |
| 2008/0146219 A1 | 6/2008 | Habermas et al. | |
| 2008/0175155 A1 | 7/2008 | Agarwal | |
| 2009/0204865 A1* | 8/2009 | Leon | H04L 1/1887 714/748 |

(Continued)

FOREIGN PATENT DOCUMENTS

EP    2 615 749 A1    7/2013

*Primary Examiner* — Feben Haile
(74) *Attorney, Agent, or Firm* — Baker & Hostetler LLP

(57) ABSTRACT

A method for transmitting data in a telecommunication network having a satellite component and a terrestrial component, the data being organized into a set of packets having an identifier, the telecommunication network comprising at least one bearer, at least one satellite and at least one terrestrial station, the method comprises the steps of: transmission of a data packet having an identifier from said satellite, reception of the data packet by the bearer, transmission of a data packet having an identifier in response to a transmitted negative acknowledgement message by the terrestrial station. A method for receiving data to be implemented on a bearer, a method for transmitting data to be implemented on a terrestrial station, and an associated data transmission system are also provided.

10 Claims, 5 Drawing Sheets

(56) References Cited

U.S. PATENT DOCUMENTS

| | | | | |
|---|---|---|---|---|
| 2010/0070817 A1* | 3/2010 | Heise | .................... | H04L 1/1841 |
| | | | | 714/749 |
| 2012/0258708 A1* | 10/2012 | Carter | ................... | H04W 76/40 |
| | | | | 455/427 |
| 2015/0318913 A1* | 11/2015 | Lauer | ................ | H04B 7/18506 |
| | | | | 455/431 |
| 2018/0083741 A1* | 3/2018 | Motoyoshi | ............. | H04B 7/195 |

* cited by examiner

METHOD AND SYSTEM FOR COMMUNICATION IN A HYBRID SATELLITE/TERRESTRIAL NETWORK

CROSS-REFERENCE TO RELATED APPLICATION

This application claims priority to foreign French patent application No. FR 1402709, filed on Nov. 28, 2014, the disclosure of which is incorporated by reference in its entirety.

FIELD OF THE INVENTION

The invention concerns the field of telecommunications, and more particularly the field of telecommunications to an aircraft via a satellite link. It aims to propose a method and a hybrid communication system in which a terrestrial link is used together with a satellite link, so as to improve the performance of the transmission. The method and system are used particularly for aeronautical communications, but can likewise be used for communications to any other type of moving bearer.

BACKGROUND

Aeronautical communication systems are frequently based on a satellite link, between a satellite and an aircraft, because, when it is moving, the aircraft is continuously visible to the satellite, which is not the case with terrestrial stations. Satellite links likewise allow a longer range than terrestrial links.

In the vicinity of some strategic sites, such as urban areas or airports, however, the aircraft will be in range of a terrestrial station.

The latency of the satellite link, connected with the propagation time from or to the satellites, is greater than that of terrestrial links. In order to limit the impact of this latency on the overall performance of the communication, it is necessary to implement a reliable data link, so as to have as little recourse as possible to processes for retransmitting the signal, such as ARQ or HARQ (standing for Automatic Repeat reQuest/Hybrid ARQ denoting an error checking method for the transmission of data) processes.

The aeronautical propagation channel is subject to many phenomena degrading the quality of the data link, such as, in particular, the Doppler effect, which are related to the movements of the aircraft.

The antennas used on a moving aircraft are generally antennas with an omnidirectional tendency in order to dispense with antenna pointing mechanisms and to simplify the implementation of antennas on the aircraft. However, for this type of antenna, the problem of multiple paths from reflections on the ground or on the fuselage arises, which is the origin of interference between received symbols.

Thus, depending on the geographical position of the aircraft and the movements of the latter, operation of the satellite data link can be greatly degraded, giving rise to systematic recourse to processes for retransmitting the signal.

The propagation channel between the aircraft and the terrestrial station is itself also subject to these constraints, but it is different than the propagation channel between the aircraft and the satellite station. Since the terrestrial station is closer to the aircraft and less constrained in terms of transmission power, the link budget of the terrestrial link will be more advantageous than that of the satellite link.

SUMMARY OF THE INVENTION

The invention therefore aims to solve the latency problems brought about by the retransmission of data when propagation conditions are degraded by proposing a hybrid terrestrial/satellite communication method.

The DVB-SH (standing for Digital Video Broadcasting—Satellite Handheld denoting a standard for digital video broadcasting by satellite for a portable receiver) or DVB-NGH (standing for Digital Video Broadcasting—Next Generation Handheld, an evolution of the DVB-SH standard) standard, which is intended for the broadcast of videos on a mobile telephone, proposes a hybrid satellite/terrestrial data link but does not describe a specific process for retransmitting packets, because it is limited to the definition of the physical layer.

It proposes the use of a waveform based on OFDM (standing for Orthogonal Frequency Division Multiplexing) modulation and the use of turbo codes. A data packet is transmitted in one and the same time slot from a satellite and a terrestrial station, all of the data being recombined in the receiver by using an MRC (standing for Maximum Radio Combining) technique in order to improve the link budget. This implementation requires synchronization between the satellite and the terrestrial stations, and is possible only through the use of OFDM modulation whose cyclic prefix allows limited time shifts to be endured. It therefore does not allow the use of a type of modulation other than OFDM modulation, the spectral occupancy and power consumption properties of which are not adapted to satellite communications, and reaches its limits when mobility variations are too great. It is therefore not adapted for implementation in high mobility context, such as aeronautical communications.

The European program SESAR (standing for Single European Sky Air traffic management Research) introduces the notion of "multilink concept", in which the link used is selected between the terrestrial link and the satellite link according to information about the quality of each link, thus aiming to increase the coverage of the system, but the links are considered to be independent and do not envisage any hybridization.

The aim of the present invention is therefore to solve, when the aircraft is in contact with a terrestrial station, the latency problems of a satellite communication link to an aircraft that are connected with the retransmission of messages by proposing a method for hybrid terrestrial/satellite communication using each of the communication links, and an associated communication system. The invention takes advantage of the propagation channel differing depending on whether the terrestrial link or the satellite link is involved, and using the terrestrial station to retransmit the data initially transmitted by means of the satellite.

The method and system can likewise be used for communications to a terrestrial vehicle or a ship, subsequently denoted by the name bearer.

To this end, the subject of the invention is a method for receiving data that is intended to be implemented on a bearer, said bearer forming part of a telecommunication network having a satellite component comprising at least one satellite, and a terrestrial component comprising at least one terrestrial station, said data being organized into a set of packets having an identifier, said telecommunication network comprising at least one said bearer, said method being characterized in that it has, for each of said data packets, the steps of:
  a) reception of a data packet transmitted by said satellite and having an identifier,
  b) recovery of the identifier and verification of correct reception of said data packet,
  c) in the event of incorrect reception of the data packet, transmission of a negative acknowledgement message comprising the identifier of the packet to said terrestrial station, and
  d) reception of a data packet corresponding to said identifier that is transmitted by the terrestrial station.

According to one embodiment, the step of transmission of a negative acknowledgement message is moreover carried out to said satellite.

According to another embodiment, the method moreover comprises:
  b') a step of memory storage of the identifier of a correctly received data packet in a database,
  b") in the event of incorrect reception of said data packet, a step of searching for said identifier in said database, so as to carry out the step of transmission of a negative acknowledgement message only when the identifier of said received data packet does not belong to said database.

The subject of the invention is likewise a method for transmitting data that is intended to be implemented in a terrestrial station forming part of a telecommunication network having a satellite component comprising at least one satellite, and a terrestrial component comprising at least one said terrestrial station, said data being organized into a set of packets having an identifier, said telecommunication network comprising at least one bearer, said method being characterized in that it has the steps of:
  A) reception of a data packet having an identifier,
  B) recovery of the identifier and verification of correct reception of said data packet,
  C) in the event of correct reception of said data packet, memory storage of said data packet and of said identifier in a database,
  D) reception of a negative acknowledgement message transmitted by said bearer having a data packet identifier,
  E) recovery of said identifier transmitted in said negative acknowledgement message,
  F) recovery, from said database, of the data packet corresponding to said identifier, and
  G) transmission of said data packet recovered from said database.

According to one embodiment of the method, said data packet having an identifier is transmitted to the terrestrial station by the satellite.

According to another embodiment of the method, said data packet having an identifier is transmitted to the terrestrial station by means of a hybridization gateway forming a link between a satellite gateway associated with said satellite and said terrestrial station.

According to another embodiment of the method, the step of transmission of said negatively acknowledged message to the bearer is carried out a plurality of times.

According to another embodiment of the method, the step of transmission of said negatively acknowledged message to the bearer is carried out using a more robust transmission plan.

The subject of the invention is likewise a method for transmitting data in a telecommunication network having a satellite component having at least one satellite, and a terrestrial component having at least one terrestrial station, said data being organized into a set of packets having an identifier, said telecommunication network comprising at least one bearer, said method being characterized in that it has the steps of:
  transmission of a data packet having an identifier from said satellite,
  reception of said data packet by the bearer, according to one of Claims 1 to 3,
  transmission of a data packet having an identifier by said terrestrial station in response to a negative acknowledgement message transmitted by said bearer, according to one of Claims 4 to 8.

According to one embodiment of the method, the transmission of a data packet by the terrestrial station in the event of reception of a negative acknowledgement message arriving from the bearer is carried out so that said packet is received by the bearer before retransmission of the message from the satellite.

According to another embodiment of the method, a satellite gateway transmits the data packets to said satellite.

According to another embodiment of the method, the data packets transmitted to the bearer moreover comprise an identifier for the transmitter.

Finally, the subject of the invention is a system for transmitting data to a bearer in a telecommunication network comprising a satellite component comprising at least one satellite, and a terrestrial component comprising at least one terrestrial station, said data being organized into a set of packets having an identifier, said telecommunication network being characterized in that it comprises at least one said satellite, at least one said bearer and at least one said terrestrial station, which are configured to implement at least one of the methods defined above.

The data transmission system therefore comprises:
  at least one satellite configured to transmit data packets to a bearer, and to receive negative acknowledgement messages from the bearer,
  at least one bearer, configured to implement the method for receiving data that is intended to be implemented on a bearer,
  at least one said terrestrial station, configured to implement the method for transmitting data that is intended to be implemented in a terrestrial station.

BRIEF DESCRIPTION OF THE DRAWINGS

The invention will be better understood and other features and advantages will become more apparent upon reading the description that follows, which is provided in nonlimiting fashion, and by virtue of the appended figures, in which.

DETAILED DESCRIPTION

Figure 1:
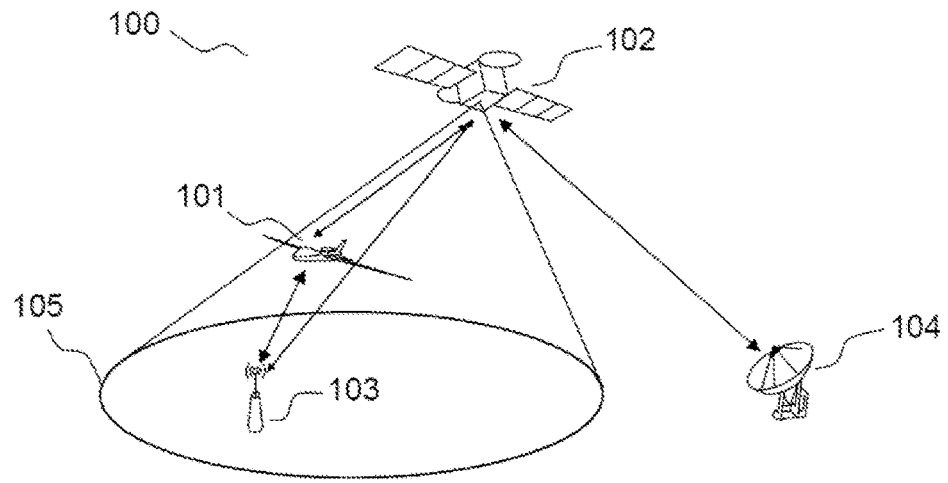
FIG. 1 shows a first embodiment of a hybrid satellite/terrestrial telecommunication network according to the invention.

FIG. 1 shows a first embodiment of a hybrid satellite/terrestrial telecommunication network 100 according to the invention. In this case, the network comprises an aircraft 101 that is intended to receive data transmitted by a satellite gateway 104 via a satellite 102. This embodiment is an opportunistic mode that fits transparently into a satellite link using an access mode of TDMA (standing for Time Division Multiple Access) type.

A terrestrial station 103 is situated in the coverage area 105 of a satellite 102, called a satellite spot, and is responsible for retransmitting messages that have not been received correctly to the aircraft.

The waveform used for the satellite link is not necessarily identical to that used by the terrestrial link. The terrestrial station needs to be capable of receiving, demodulating and decoding the information arriving from the satellite and from the bearer, the bearer needs to be capable of receiving, demodulating and decoding the information arriving from the satellite and from the terrestrial station, but the terrestrial and satellite links can use different waveforms or different carrier frequencies.

The data are organized into a set of packets whose header contains a piece of information allowing them to be identified. This header is more protected against errors than the useful data transmitted in said packets, so as to be able to guarantee that it is received in conditions for which reception of the useful data is not possible.

In the first embodiment, the terrestrial link and the satellite link are not connected by communication means: the satellite link has no knowledge of the fact that the bearer is likewise connected to a terrestrial station. The satellite link is therefore made according to a normal mode of operation.

When a data packet needs to be transmitted to the bearer, the satellite gateway 104 transmits these data to the satellite 102, which retransmits them over the whole of the satellite spot 105.

Since the bearer and the satellite station form part of the satellite spot, they will both receive the data packet, recover the identifier and verify correct reception of the packet.

The terrestrial station is static, and can be equipped with high-gain directional antennas. Thus, the propagation channel between the terrestrial station and the satellite resembles a Gaussian propagation channel, and the link budget is favourable. Conditions for reception of the data packet are therefore good.

The bearer moves, which gives rise to the appearance of a Doppler effect that interferes with reception of the data. In the case of an aircraft, the use of nondirectional antennas (generally omnidirectional or very wide aperture antennas) likewise makes it sensitive to reflections of the electromagnetic wave on the ground, or on the fuselage. These reflections give rise to the appearance of multiple paths generating intersymbol interference, degrading the quality of the propagation channel. Finally, the aircraft may be subject to masking phenomena according to the position of its antennas and its orientation.

Therefore, the data packet received by the aircraft may be severely degraded according to its position, its speed of movement and its environment.

When the bearer 101 is not capable of demodulating and decoding a data packet correctly, it transmits a negative acknowledgement message comprising the identifier of the incorrectly received packet.

This negative acknowledgement message is received by the terrestrial station and by the satellite station, and they will respond to it by retransmitting the negatively acknowledged data packet.

The acknowledgement protocol is dependent on the network protocol used. If, by way of example, the protocol used is of TCP (standing for Transmission Control Protocol) type, all packets are the subject of an acknowledgement or negative acknowledgement message, whereas if the protocol used is of NORM (standing for Negative acknowledgement Oriented Reliable Multicast) type, correctly received packets are not the subject of an acknowledgement message.

Figure 2:
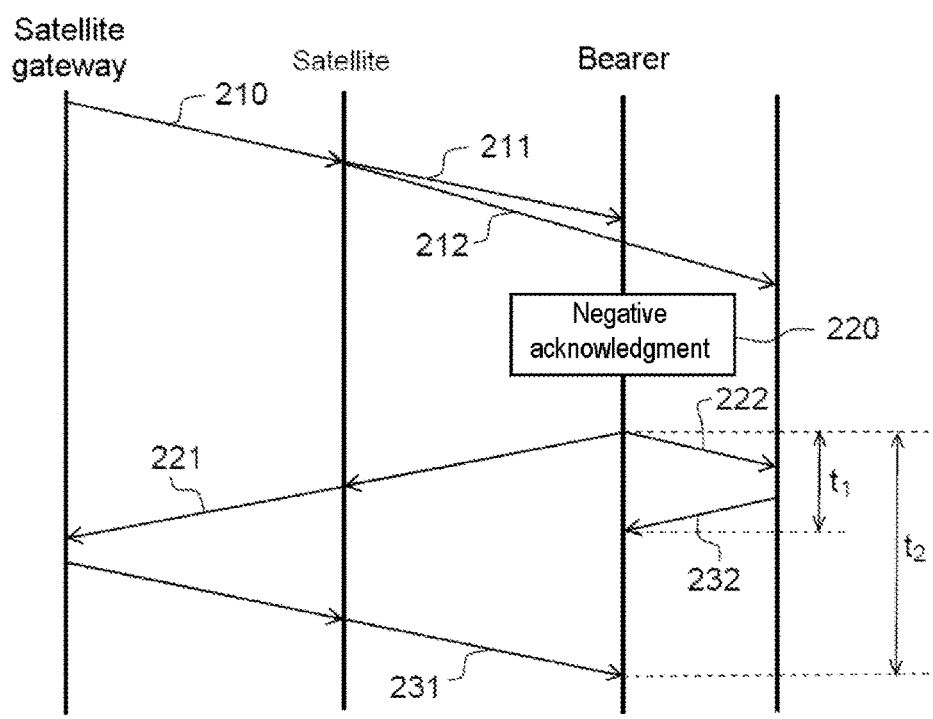
FIG. 2 shows an overview of the concatenation of the messages in the first embodiment.

FIG. 2 shows an overview of the concatenation of the messages in this first embodiment.

The satellite gateway transmits a data packet 210 via the satellite, to the bearer 211 and the terrestrial station 212.

When the data packet is received incorrectly by the aircraft, the latter transmits a negative acknowledgement message 220.

This negative acknowledgement message will be sent to the satellite gateway by means of the satellite 221, the satellite gateway will interpret and retransmit said incorrectly received packet, via the satellite 231.

The time $t_2$ for the satellite gateway to respond to the negative acknowledgement message transmitted by the aircraft will therefore be, taking a geostationary satellite (altitude 35 784 km) and an aircraft at a height h in km into consideration:

$$t_2 = \frac{2*(35784 - h) + 2*35784}{c},$$

c being the speed of light in km/sec.

Considering that the altitude of the aircraft is negligible in relation to the altitude of the satellite, the time $t_2$ for retransmission of a data packet is approximately 500 milliseconds.

The terrestrial station, which has likewise received and stored the data packet, interprets the negative acknowledgement message 222 and responds by retransmitting the packet 232.

The retransmission is made immediately following reception of the negative acknowledgement message. In this way, the message reaches the aircraft before the retransmission that is made from the satellite gateway, so as not to generate any collisions.

The time $t_1$ for response by the terrestrial station is, on the same assumptions as previously, and taking Dt as the distance between the aircraft and the terrestrial station expressed in km:

$$t_1 = \frac{2*Dt}{c}.$$

According to the distance $D_t$, the time $t_1$ for retransmission of a data packet will be a few milliseconds.

The ratio between t1 and t2, representing the improvement in performance that is produced with this embodiment, is:

$$\frac{t_2}{t_1} = \frac{2*35784 - h}{D_t}.$$

The first embodiment requires, at the terrestrial stations, memory storage of the correctly received data packets arriving from the satellite so as to be able to retransmit it to the bearer if necessary. A period of memory storage may be linked to the size of the cell taking into consideration the maximum propagation time necessary for a negative acknowledgement message to reach it, for example, or to the maximum retransmission time for a data packet from the satellite gateway.

Once this period has elapsed, the memory taken up by the message can be freed.

The terrestrial station does not necessarily have to be able to interpret all of the protocols of the satellite system in this embodiment. The reason is that it suffices for it to be capable of extracting the sequence numbers of the data packets and of the negative acknowledgement messages received. The other header fields of the protocol do not need to be interpreted.

Advantageously, the data packets have, besides their identifier, a signalling field revealing the origin of the transmission of the message.

Thus, when the bearer receives the retransmission of a data packet from the terrestrial station and this packet is received incorrectly, it is configured not to respond with a negative acknowledgement message.

Equally, the bearer is configured not to take into account the retransmission of a data packet from the satellite gateway when said data packet has been received correctly meanwhile by means of the retransmission from the terrestrial station.

Advantageously, and according to the altitude of the aircraft, the retransmission of a data packet from the terrestrial station can be carried out a plurality of times, the number of retransmissions being limited so that the last retransmission of the data packet from the terrestrial station reaches the bearer before the retransmission of the data packet from the satellite gateway.

Advantageously, the terrestrial station can retransmit the data packet by using a more robust transmission plan than the plan of the satellite link, for example by modifying the coding rate of the data or the type of modulation so as to increase the margin of resistance of the data link to errors related to propagation conditions.

The advantages of this first embodiment of the invention are as follows:
- The latencies related to the retransmission of a data packet are reduced,
- Implementation at the ground stations requires only few modifications: it is limited to memory storage of the packets received from the satellite,
- Implementation at the satellite gateways and the satellites does not require any modifications,
- Implementation at the bearers requires only few modifications: it is limited to management of the acknowledgement/negative acknowledgement messages,
- Retransmission of the negatively acknowledged data packets is carried out systematically by the satellite link, thus guaranteeing the absence of any packet loss when the bearer leaves the coverage area of a terrestrial station.

Figure 3:
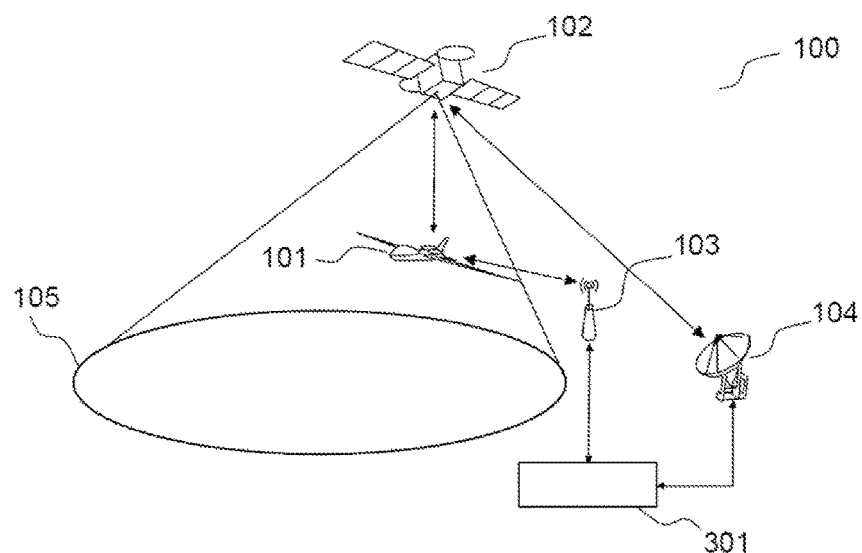
FIG. 3 shows a second embodiment of a hybrid satellite/terrestrial telecommunication network according to the invention.

The second embodiment, which is shown in FIG. 3, is distinguished from the first embodiment in that the terrestrial station 103 to which the aircraft 101 is connected is outside the coverage area 105 of the satellite 102.

In this second embodiment, the data to be transmitted are distributed to the satellite gateway 104 and to the terrestrial station. This distribution can be carried out by means of a hybridization gateway 301 forming the link between the satellite gateway and the terrestrial station. This hybridization gateway is a point of entry for the data into the system. It adds a piece of control information to the data so as to allow correspondence between the sequence numbers of the various packets that are sent on each of the links, and distributes them to the terrestrial station and to the satellite gateway.

The identifiers of the data packets can be added by protocols that are situated at higher levels than that of the MAC (standing for Media Access Control) layer. Thus, the numbering of the packets may differ between the terrestrial station and the satellite gateway. The hybridization gateway can therefore comprise an interpreter that is intended to make the link between the identifiers of the data packets at the terrestrial station and the identifiers of the data packets at the satellite gateway.

This hybridization gateway likewise allows the satellite gateway to know whether or not the bearer is connected to a terrestrial station.

Figure 4:
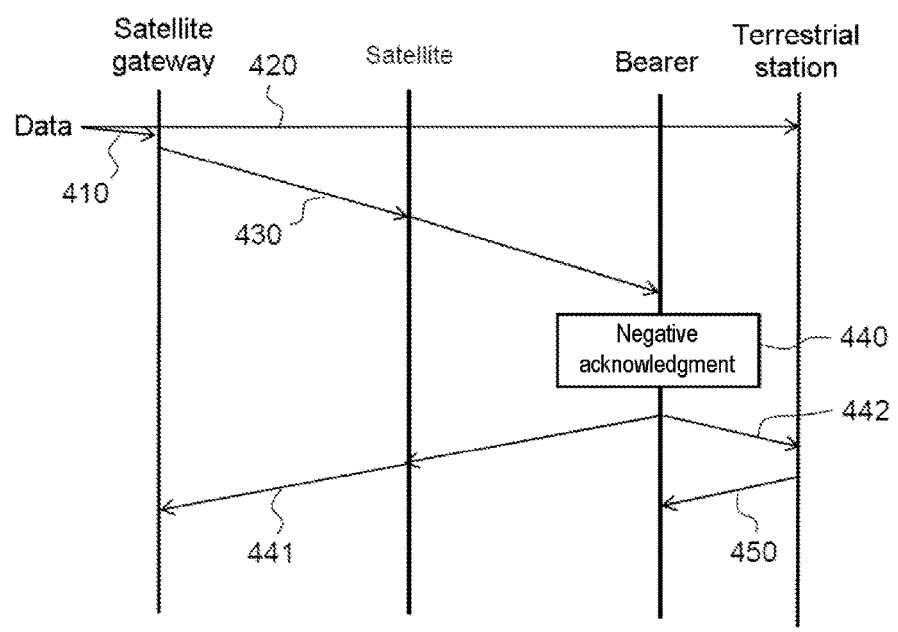
FIG. 4 shows an overview of the concatenation of the messages in the second embodiment.

The operating principle of this second embodiment is illustrated by FIG. 4.

The data to be transmitted are transmitted to the satellite gateway 410 and to the terrestrial station 420 by the hybridization gateway 301.

The satellite gateway sends 430 a data packet to the bearer, by means of the satellite.

When the bearer is not capable of demodulating and decoding a data packet correctly, it sends a negative acknowledgement message 440. According to the protocol used, it can likewise transmit an acknowledgement message when it has received a packet correctly.

The satellite retransmits 441 this negative acknowledgement message to the satellite gateway. The latter knows, by means of the hybridization gateway, that the bearer is connected to a terrestrial station, and it therefore does not respond to the negative acknowledgement message.

The terrestrial station receives the negative acknowledgement message 442, and is configured to retransmit the negatively acknowledged packet 450, by using the packet identifier contained in the negative acknowledgement message.

The negatively acknowledged packet can be supplied to the terrestrial station by the hybridization gateway. It may likewise have been supplied beforehand to the terrestrial station, which stores it in memory, so as to reduce latencies.

In a manner similar to the first embodiment, the retransmission of the message from the terrestrial station can be carried out a plurality of times, and can use a more robust mode of transmission.

In the second embodiment, if the bearer is not capable of correctly receiving the data packet retransmitted by the terrestrial station, it transmits a negative acknowledgement message again.

The advantages of this second embodiment of the invention are as follows:

The latencies related to the retransmission of a data packet are reduced,

The use of the satellite resource is optimal, since the satellite gateway does not respond to negative acknowledgement messages, The terrestrial station is not subject to the geographical constraint of positioning in the coverage area of the satellite, the only constraint being that the bearer is situated in the coverage area of the satellite and of the terrestrial station, Its implementation at the ground stations requires only few modifications: it is limited to setup of a communication link to the satellite gateway and memory storage of the data packets, Its implementation at the satellite gateways requires only few modifications: it is limited to set up of a communication link to the terrestrial station, Its implementation at the satellites does not require any modifications, Its implementation at the bearers does not require any modifications, The terrestrial station and the satellite gateway exchange information indicating whether or not the bearer is connected to the terrestrial station. When the bearer leaves the coverage area of the terrestrial station, the satellite gateway responds to the negative acknowledgement messages, thus guaranteeing the absence of any data packet loss.

Figure 5:
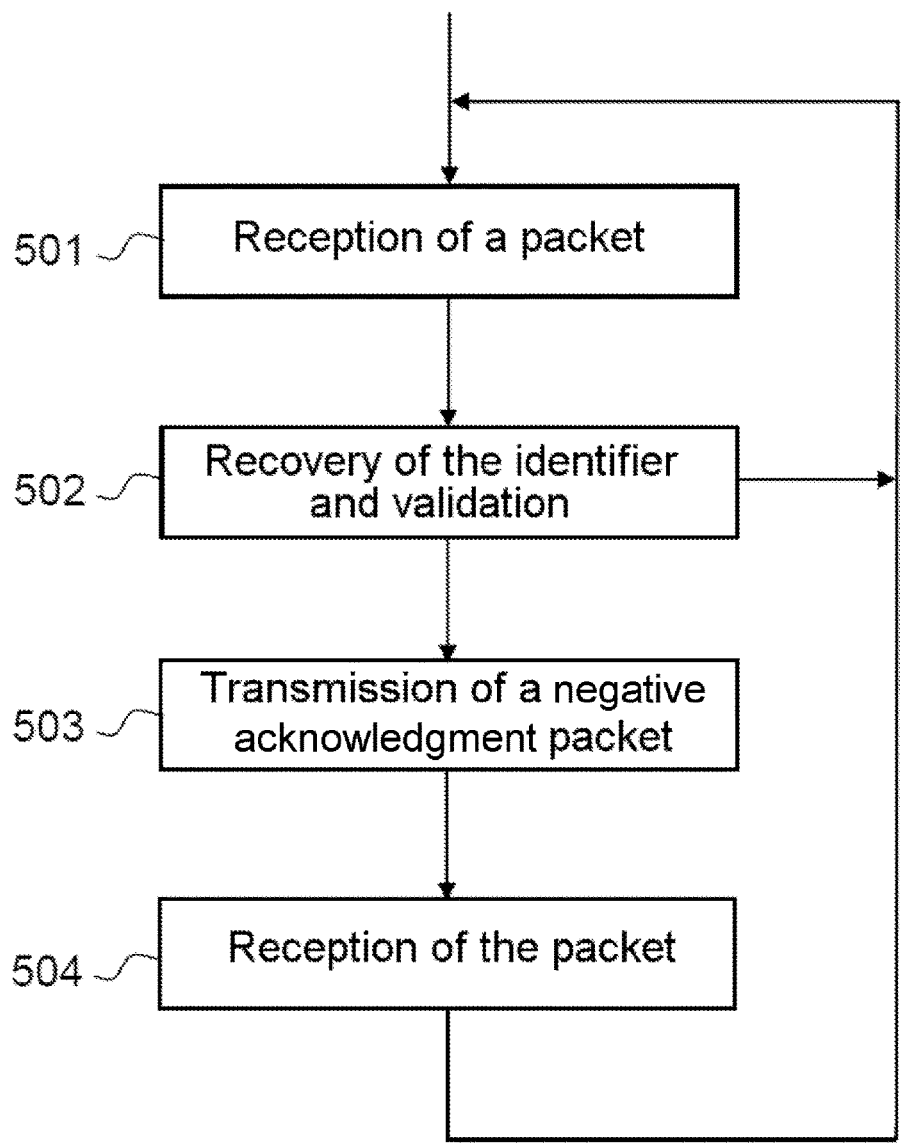
FIG. 5 illustrates an example of sequencing for the method according to the invention implemented on the aircraft.

FIG. 5 shows an example of sequencing for the method according to the invention implemented on the bearer.

When the bearer receives a data packet 501 transmitted from a satellite gateway via a satellite, it performs a step 502 of recovery of the identifier contained in this data packet, and of validation of correct reception of the packet.

This validation of correct reception is dependent on the standard used for transmitting the data, and can take a plurality of different forms, such as computation of a CRC (Cyclic Redundancy Check) pattern at the physical layer or the MAC layer.

If the packet has been received correctly, then the bearer awaits a new data packet from the satellite gateway, or transmits an acknowledgement message if the protocol used so requires.

If the packet has not been received correctly, then the bearer carries out a step of transmission of a negative acknowledgement message 503 containing the identifier of the data packet, and then awaits retransmission of the data packet from the terrestrial station 504.

Figure 6:
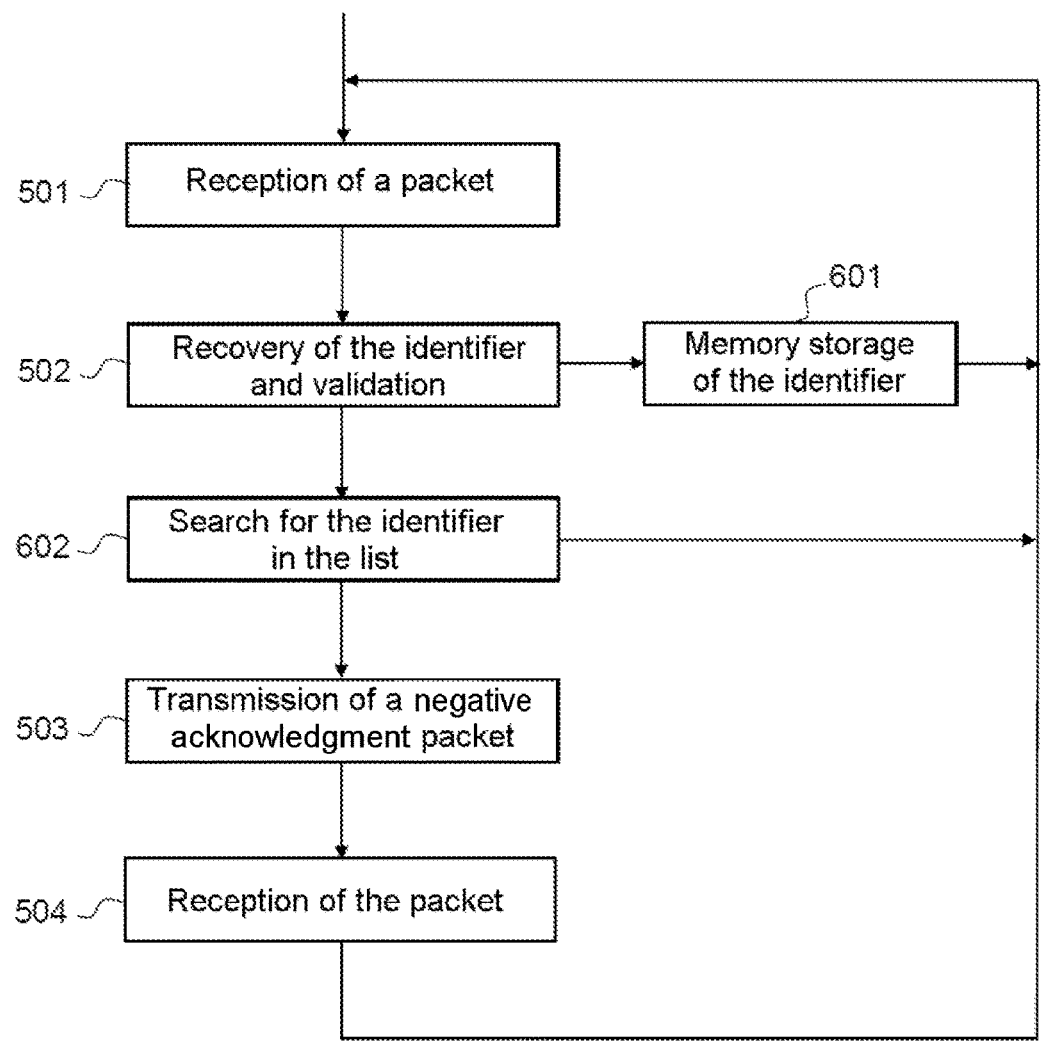
FIG. 6 illustrates a second example of sequencing for the method according to the invention implemented on the aircraft.

FIG. 6 shows an example of sequencing for the method according to the invention implemented on the bearer when the embodiment corresponds to the first embodiment, which is shown in FIG. 1.

Besides the steps shown in FIG. 5, when it receives a data packet correctly, the bearer carries out a step 601 of memory storage of the identifier in a database, a list or any other appropriate mechanism.

If the message has not been received correctly, then the bearer will look for the identifier in the database 602 before taking the decision to transmit, or not to transmit, a negative acknowledgement message.

If the message belongs to the database, this means that it has been received correctly beforehand. This scenario arises when data packet is received from the satellite in response to a negative acknowledgement message, the message having been retransmitted meanwhile by the terrestrial station.

In this scenario, the bearer does not transmit a negative acknowledgement message, and returns to the state of awaiting a data packet.

If the message belongs to the database, the bearer will transmit a negative acknowledgement message 503 before receiving the retransmission of the packet 504 from the terrestrial station.

Figure 7:
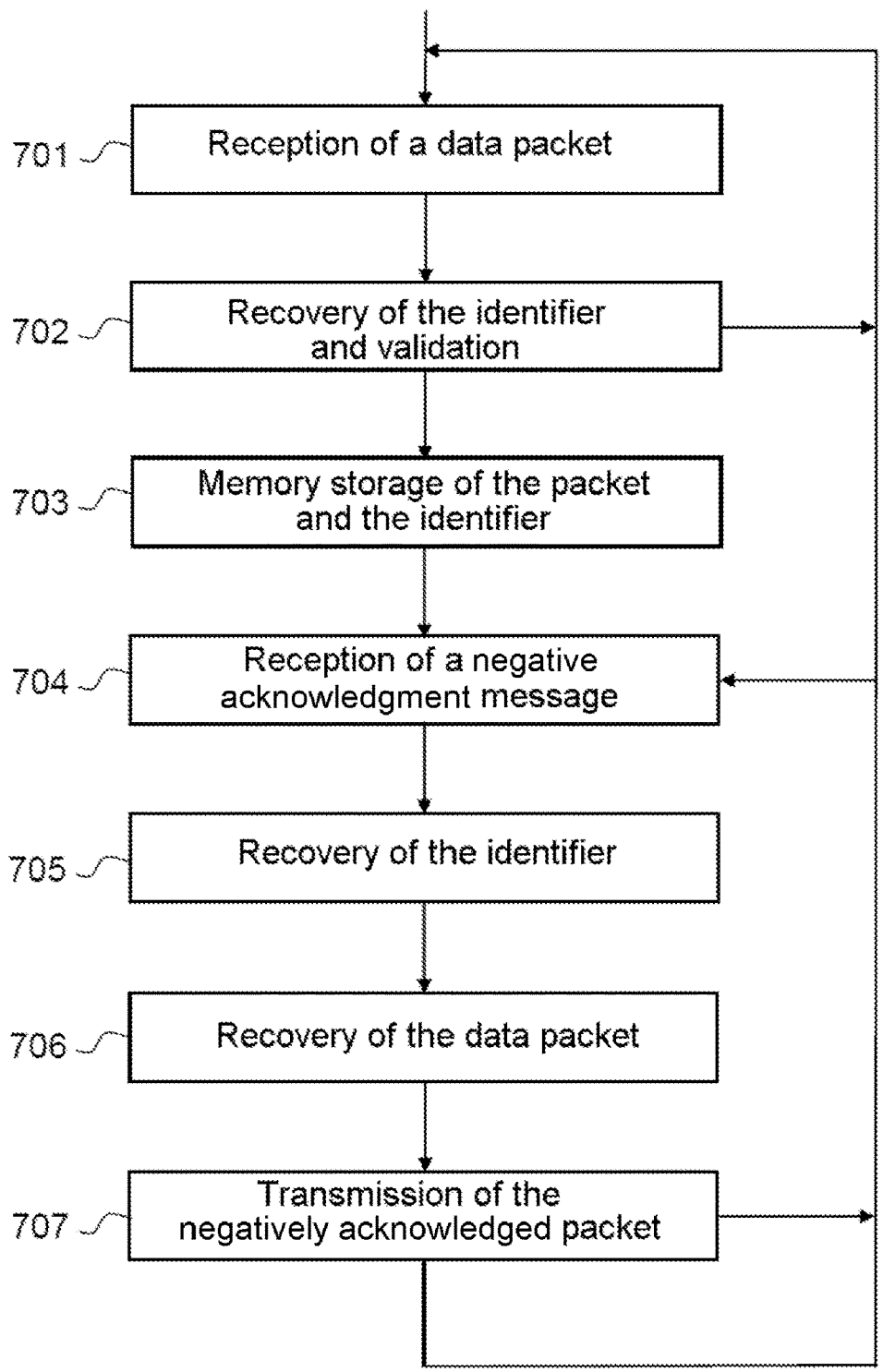
FIG. 7 illustrates an example of sequencing for the method according to the invention implemented on a terrestrial station.

FIG. 7 shows an example of sequencing for the method according to the invention implemented on a terrestrial station.

According to the configuration of the network, the terrestrial station can receive the data packets to be retransmitted one by one (case of the first embodiment) or in groups (case of the second embodiment in which the data packets are transmitted in groups to the terrestrial station and to the satellite gateway).

Following the reception 701 of a data packet, the terrestrial station recovers 702 the identifier of the packet, and validates correct reception. If the packet has been received incorrectly, then the terrestrial station returns to the state of awaiting a new packet. If it has been received correctly, the data packet and the associated identifier are stored in memory 703 for a period that is preferably above the maximum time for reception of a negative acknowledgement message.

The memory storage of the data packet can equally be effected in a database, or by using the memory of the hardware on which the method is implemented.

The received message can originate from a satellite when the terrestrial station belongs to the satellite spot, as in the first embodiment, or a hybridization gateway allowing the data to be shared between the satellite gateway and the terrestrial station, as in the second embodiment.

If the data are transmitted in grouped fashion, the terrestrial station can reiterate steps 701, 702 and 703 before moving to step 704 of reception of a negative acknowledgement message.

When the terrestrial station receives a negative acknowledgement message 704 transmitted via the bearer, it carries out a step 705 of recovery of the transmitted identifier, and then recovery of the data packet 706 corresponding to the identifier in the data stored in memory.

If the packet is not in memory, then the terrestrial station returns to the state of awaiting a new data packet or negative acknowledgement message.

If the packet is in memory, then the terrestrial station transmits it 707 to the bearer.

All of the methods are intended to be executed on any medium of a piece of telecommunication equipment, such as a processor, a DSP (standing for Digital Signal Processor), an FPGA (standing for Field Programmable Gate Array), or an ASIC (standing for Application-Specific Integrated Circuit), for example.

The invention claimed is:

1. A method for transmitting data in a telecommunication network having a satellite component having at least one satellite to communicate through a satellite link, and a terrestrial component having at least one terrestrial station to communicate through a terrestrial link, said data being organized into a set of packets having an identifier, said telecommunication network comprising at least one bearer, said method comprising the steps, performed for each data packet, of:

transmission of a data packet having an identifier from said satellite through said satellite link, reception of said data packet by the bearer, according to the steps of:

a) reception of said data packet transmitted by said satellite through the satellite link, b) recovery of the identifier and verification of correct reception of said data packet, c) in the event of incorrect reception of the data packet, transmission of a negative acknowledgement message comprising the identifier of the data packet to at least said terrestrial station through the terrestrial link, and d) reception of a data packet corresponding to said identifier that is transmitted by the terrestrial station in response to the negative acknowledgement message through the terrestrial link, processing said data packet by the terrestrial station, according to the steps of:

A) receiving the data packet from said satellite through the satellite link,

B) recovering the identifier and verifying the correct reception of the data packet, C) in the event of correct reception of said data packet, memory storing the data packet and the identifier in a database, D) when receiving a negative acknowledgement message transmitted by the bearer having a data packet identifier through the terrestrial link:

E) recovering the identifier transmitted in the negative acknowledgement message, F) recovering, from the database, the data packet corresponding to the identifier, and G) transmitting the data packet recovered from the database to said bearer through the terrestrial link so that said data packet is received by the bearer before the retransmission of the data packet made from the satellite.

2. The method according to claim 1, wherein a satellite gateway transmits the data packets to said satellite.

3. The method according to claim 1, wherein the data packets transmitted to the bearer further comprise an identifier for the transmitter.

4. A system for transmitting data to a bearer in a telecommunication network comprising a satellite component comprising at least one satellite to communicate through a satellite link, and a terrestrial component comprising at least one terrestrial station to communicate through a terrestrial link, said data being organized into a set of packets having an identifier, said telecommunication network comprising at least one said satellite, at least one said bearer and at least one said terrestrial station which are configured to implement the method according to claim 1.

5. The method according to claim 1, wherein the step, performed by the terrestrial station, of transmitting the negatively acknowledged message to the bearer is carried out a plurality of times.

6. The method according to claim 1, wherein the step, performed by the terrestrial station, of transmission of said negatively acknowledged message to the bearer is carried out using a more robust mode of transmission.

7. A method for transmitting data in a telecommunication network having a satellite component having at least one satellite to communicate through a satellite link, a terrestrial component having at least one terrestrial station to communicate through a terrestrial link, and a hybridization gateway forming a link between a satellite gateway associated with said satellite and said terrestrial station, said data being organized into a set of packets having an identifier, said telecommunication network further comprising at least one bearer, said method comprising the steps of:

transmission of a data packet having an identifier from said hybridization gateway to the satellite gateway and to the terrestrial station, transmission of said data packet from said satellite gateway by means of the satellite through said satellite link, reception of said data packet by the bearer, according to the steps of:

a) reception of said data packet transmitted by said satellite through the satellite link, b) recovery of the identifier and verification of correct reception of said data packet, c) in the event of incorrect reception of the data packet, transmission of a negative acknowledgement message comprising the identifier of the data packet to at least said terrestrial station through the terrestrial link, and d) reception of a data packet corresponding to said identifier that is transmitted by the terrestrial station in response to the negative acknowledgement message through the terrestrial link, processing of said data packet by the terrestrial station, according to the steps of:

A) receiving the data packet from the hybridization gateway,

B) recovering the identifier and verifying the correct reception of the data packet, C) in the event of correct reception of said data packet, memory storing the data packet and of the identifier in a database, D) when receiving a negative acknowledgement message transmitted by the bearer through the terrestrial link:

E) recovering the identifier transmitted in the negative acknowledgement message, F) recovering, from the database, the data packet corresponding to the identifier, and G) transmitting the data packet recovered from the database to said bearer through the terrestrial link so that said data packet is received by the bearer before the retransmission of the data packet made from the satellite.

8. The method according to claim 7, wherein the step, performed by the terrestrial station, of transmitting the negatively acknowledged message to the bearer is carried out a plurality of times.

9. The method according to claim 7, wherein the step, performed by the terrestrial station, of transmission of said negatively acknowledged message to the bearer is carried out using a more robust mode of transmission.

10. A system for transmitting data to a bearer in a telecommunication network comprising a satellite component comprising at least one satellite to communicate through a satellite link, a terrestrial component comprising at least one terrestrial station to communicate through a terrestrial link, and a hybridization gateway forming a link between a satellite gateway associated with said satellite and said terrestrial station, said data being organized into a set of packets having an identifier, said telecommunication network comprising at least one said satellite, at least one said bearer and at least one said terrestrial station which are configured to implement the method according to claim 7.

* * * * *